United States Patent
Mune et al.

(10) Patent No.: US 7,167,629 B2
(45) Date of Patent: *Jan. 23, 2007

(54) OPTICAL WAVEGUIDE AND PRODUCTION METHOD THEREOF

(75) Inventors: Kazunori Mune, Osaka (JP); Amane Mochizuki, Osaka (JP); Yusuke Shimizu, Osaka (JP); Naotaka Kinjou, Osaka (JP)

(73) Assignee: Nitto Denko Corporation, Ibaraki (JP)

( * ) Notice: Subject to any disclaimer, the term of this patent is extended or adjusted under 35 U.S.C. 154(b) by 30 days.

This patent is subject to a terminal disclaimer.

(21) Appl. No.: 11/057,496

(22) Filed: Feb. 15, 2005

(65) Prior Publication Data

US 2005/0201714 A1    Sep. 15, 2005

(30) Foreign Application Priority Data

Feb. 16, 2004   (JP) .............................. 2004-037608
Jun. 17, 2004   (JP) .............................. 2004-180243

(51) Int. Cl.
  *G02B 6/00*   (2006.01)
  *G02B 6/10*   (2006.01)
  *B29D 11/00*  (2006.01)

(52) U.S. Cl. ............... 385/143; 264/1.24; 385/141; 385/142; 385/129; 385/132

(58) Field of Classification Search ............... 264/1.24; 385/132, 143
See application file for complete search history.

(56) References Cited

U.S. PATENT DOCUMENTS

| | | | |
|---|---|---|---|
| 6,477,284 B1 | 11/2002 | Oda et al. | |
| 6,777,070 B1 * | 8/2004 | Murata et al. | 428/323 |
| 6,780,502 B1 * | 8/2004 | Inaba et al. | 428/327 |
| 2003/0053765 A1 | 3/2003 | Oda et al. | |
| 2006/0029891 A1 * | 2/2006 | Mune et al. | 430/321 |
| 2006/0086533 A1 * | 4/2006 | Naitou et al. | 174/255 |

FOREIGN PATENT DOCUMENTS

| | | |
|---|---|---|
| EP | 0 446 672 A1 | 9/1991 |
| JP | 10-268152 | 10/1998 |
| JP | H10-332960 A | 12/1998 |
| JP | 2001-4858 | 1/2001 |
| JP | 2001-192433 A | 7/2001 |
| JP | 2002-47335 | 2/2002 |
| JP | 2004-083855 | 3/2004 |

* cited by examiner

*Primary Examiner*—Brian Healy
*Assistant Examiner*—Charlie Peng
(74) *Attorney, Agent, or Firm*—Jean C. Edwards; Akerman Senterfitt

(57) ABSTRACT

An optical waveguide and a production method thereof that can provide increased production efficiency, improved workability, and/or production stability. According to non-limiting example embodiments a photopolymerizable resin composition comprising a fluorene derivative and a photo-acid generator is coated over an under clad layer and then is dried, to form a resin layer having substantially no surface tack. The resin layer is exposed to light in the state of being contacted with a photo mask by a contact exposure method and then is developed, to form the resin layer into a pattern. Thereafter, the resin layer is cured to form a core layer and then an over clad layer is formed on the under clad layer in such a manner as to cover the core layer, to thereby produce an optical waveguide.

20 Claims, 1 Drawing Sheet (a)

(b)

(c)

(d)

(e)

(f)

(g)

(h)

OPTICAL WAVEGUIDE AND PRODUCTION METHOD THEREOF

BACKGROUND OF THE INVENTION

1. Field of the Invention

The present invention relates to an optical waveguide and to a production method thereof. More particularly, the present invention relates to an optical waveguide made by using polymer material and to a production method thereof

2. Description of the Prior Art

An optical waveguide is widely used to optically connect a plurality of optical devices. In recent years, various attempts on the forming of this optical waveguide from polymer material to enhance the workability and the mass production have been considered.

For example, JP Laid-open (Unexamined) Patent Publication No. Hei 10-268152 proposes that photosensitive resin in liquid form, such as epoxy oligomer and acrylic oligomer, is coated over an under clad layer, then is exposed to light through a mask, and then is developed with solvent, to form a pattern into a core layer.

However, since the photosensitive resin mentioned above is in the liquid form before it is exposed to light, a given space must be formed between the mask and the photosensitive resin for exposing the coated photosensitive resin to light. For example, as shown in FIG. 6 of the publication cited above, a spacer is interposed between the mask and the photosensitive resin to define a space therebetween.

However, the interposition of the spacer therebetween requires increased number of processes and time-consuming and complicated works, making it hard to provide increased production efficiency.

Further, the photosensitive resin in the liquid form provides the disadvantages that the mask can be contaminated by the resin in the handling and that owing to the fluidity of the resin, the optical waveguide cannot be defined therebetween in a stable form.

SUMMARY OF THE INVENTION

It is the object of the present invention to provide a production method of an optical waveguide that can provide increased production efficiency and can also provide improved workability and production stability and provide an optical waveguide produced by the production method of the optical waveguide.

The present invention provides a production method of an optical waveguide comprising the step of forming a core layer from photopolymerizable resin composition comprising fluorene derivative expressed by the following general formula (1) and a photoacid generator:

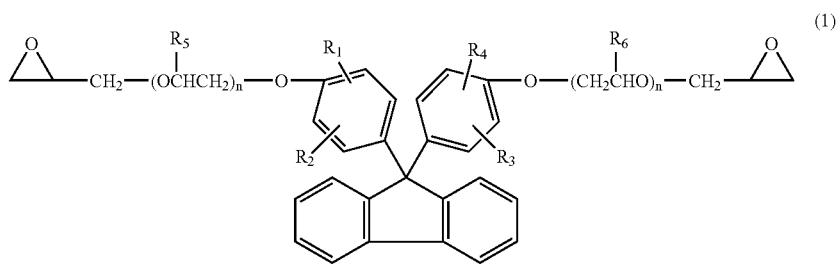

(1)

(In the formula, R1–R4 are the same or different from each other and each of them represents a hydrogen atom or an alkyl group with carbon number 1–6, R5 and R6 are the same or different from each other and each of them represents a hydrogen atom or a methyl group, and n represents an integer of 0–10 for each repeating unit).

In this production method, it is preferable that in the formula (1), R1–R6 are all hydrogen atoms, and n is 0 or 1 for each repeating unit.

Also, the present invention provides a production method of an optical waveguide comprising the step of forming a core layer from photopolymerizable resin composition comprising a fluorene derivative expressed by the following general formula (2) and a photoacid generator:

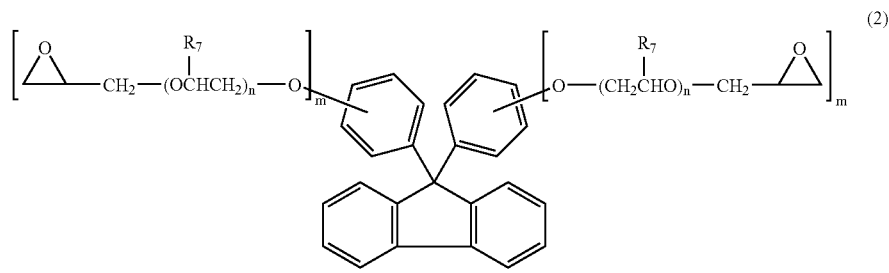

(2)

(In the formula, R7 represents a hydrogen atom or a methyl group for each, n represents an integer of 0–10 for each repeating unit, and m represents an integer of 2–5 for each repeating unit).

In this production method, it is preferable that in the formula (2), n is 0 for both repeating units and m is 2 for both repeating units.

In this production method, it is preferable that the method further comprises the step of forming an under clad layer, wherein the step of forming the core layer comprises the step of forming a resin layer on the under clad layer by coating the photopolymerizable resin composition comprising the fluorene derivative expressed by the general formula (1) and/or the general formula (2) and the photoacid generator over the under clad layer and then heating it; and the step of forming the resin layer and the step of forming the resin layer into a pattern.

Further, it is preferable that the step of forming the resin layer into a pattern comprises the step of exposing the resin layer to light in the state of being contacted with a photo mask by a contact exposure method and then developing the resin layer.

The present invention covers an optical waveguide comprising a core layer formed from photopolymerizable resin composition comprising fluorene derivative expressed by the following general formula (1) and a photoacid generator:

(In the formula, R7 represents a hydrogen atom or a methyl group for each, n represents an integer of 0–10 for each repeating unit, and m represents an integer of 2–5 for each repeating unit).

In this invention, it is preferable that in the formula (2), n is 0 for both repeating units and m is 2 for both repeating units.

In the production method of the optical waveguide of the present invention, since the core layer is formed of photopolymerizable resin composition comprising a fluorene derivative and photoacid generator, the core layer can be patterned reliably when the core layer is formed. Particularly when the core layer is patterned by the exposure to light and the development, the core layer can be put in contact with the photo mask for the exposure to light without any need to define a predetermined space between the photo mask and the resin layer formed from the photopolymerizable resin composition.

Thus, according to this method, the number of processes and time-consuming and complicated works involved in the interposition of the spacer can be reduced, thus providing increased production efficiency. In addition, even when the photo mask is put in contact with the resin layer, the contamination of the photo mask can be reduced. Further, since the resin layer is hard to flow, the optical waveguide can be formed in a stable form.

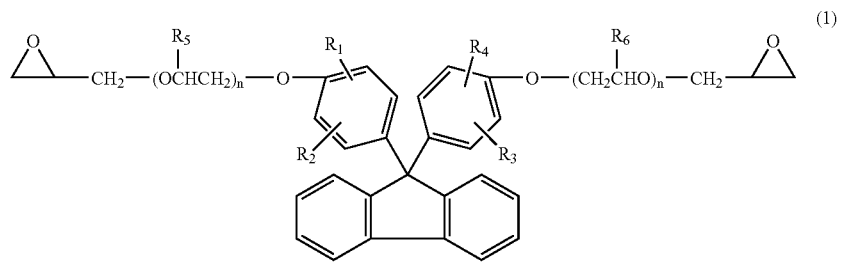

(1)

(In the formula, R1–R4 are the same or different from each other and each of them represents a hydrogen atom or an alkyl group with carbon number 1–6, R5 and R6 are the same or different from each other and each of them represents a hydrogen atom or a methyl group, and n represents an integer of 0–10 for each repeating unit).

In this invention, it is preferable that in the formula (1), R1–R6 are all hydrogen atoms, and n is 0 or 1 for each repeating unit.

Also, the present invention covers an optical waveguide comprising a core layer formed from photopolymerizable resin composition comprising fluorene derivative expressed by the following general formula (2) and a photoacid generator:

As a result of this, the optical waveguide of the present invention can be produced at reduced costs by virtue of the improved production efficiency and also can be applicable in various fields as the optical waveguide of high quality having excellent shape stability.

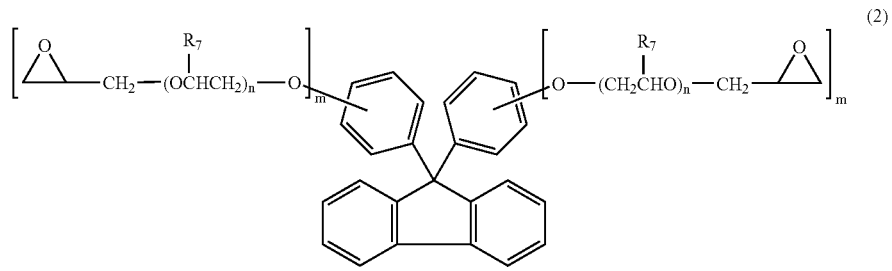

(2)

(c) shows the process of forming a resin layer on the under clad layer;
(d) shows the process of exposing the resin layer to light through a photo mask;
(e) shows the process of developing the resin layer to form a pattern of the resin layer;
(f) shows the process of forming a core layer by curing the resin layer;
(g) shows the process of forming an over clad layer on the under clad layer in such a manner as to cover the core layer; and
(h) shows the process of removing the substrate.

DETAILED DESCRIPTION OF THE PREFERRED EMBODIMENTS

Figure 1:
FIG. 1 is a production process drawing showing an embodiment of a production method of an optical waveguide of the present invention:
(a) shows the process of preparing a substrate;
(b) shows the process of forming an under clad layer on the substrate.
Figure 1:
Figure 1:
Figure 1:
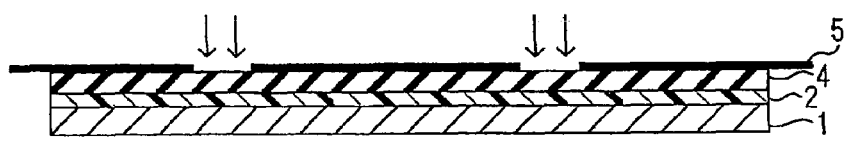
Figure 1:
Figure 1:
Figure 1:
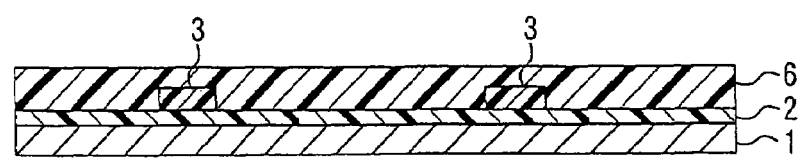
Figure 1:

FIG. 1 is a production process drawing showing an embodiment of a production method of an optical waveguide of the present invention.

In the method illustrated in FIG. 1, a substrate 1 is prepared, first, as shown in FIG. 1(a).

No particular limitation is imposed on the substrate 1. For example, a ceramic substrate of e.g. a silicon wafer and a glass, a metal substrate of e.g. copper, aluminum, stainless steel, and iron alloy, and a plastic substrate of e.g. polyimide and glass-epoxy may be used as the substrate. In addition, a laminate substrate wherein a thin metal film is laminated on a glass substrate, and a wired circuit board wherein a metal wiring is previously given to a substrate may be used as the substrate. When the substrate 1 is removed finally to form an optical waveguide in a film form, what is called, a flexible optical waveguide, as mentioned later, the metal substrate or the laminate substrate that can be etched is preferably used.

The substrate 1 has a thickness of e.g. 10–5,000 μm, or preferably 10–1,5001 μm.

Then, an under clad layer 2 is formed on the substrate 1, as shown in FIG. 1(b).

No particular limitation is imposed on the under clad layer 2 as long as the refractive index of the core layer 3 is lower than that of the under clad layer 2, as mentioned later. The under clad layer 2 is formed of resin, such as polyimide resin and epoxy resin, for example. It may alternatively formed of photopolymerizable resin, as mentioned later. When the under clad layer 2 is patterned, it is preferable that the under clad layer is formed of photosensitive resin.

No particular limitation is imposed on the forming of the under clad layer 2. The under clad layer 2 can be formed in the following process, for example. Varnish comprising the above-said resin dissolved in solvent is coated over the substrate 1, first. Then the solvent is removed from the varnish, to form the resin layer on the under clad layer 2. Thereafter, in the case where photosensitive resin is used as the resin, the photosensitive resin is exposed to light and developed to form a pattern of the under clad layer 2 by a known method. Then, the under clad layer 2 thus patterned is cured by heating.

The coating of the varnish is performed using, for example, a spin-coating method, a dipping method, a casting method, an injection method, and an ink-jet method.

The curing of the resin is performed by heating in an adequate temperature range. For example when polyimide resin is formed, the polyimide resin is cured by heating in the range of 300–400° C.

The under clad layer 2 is formed to have thickness of e.g. 5–50 μm for a multi-mode optical waveguide. It is formed to have thickness of e.g. 1–20 μm for a single-mode optical waveguide.

In the case of the substrate 1 with a low refractive index, the substrate 1 itself can be used as the under clad layer 2. In this case, a core layer 3 is formed on the under clad layer 2 formed by the substrate 1.

In forming the under clad layer 2, a coupling agent can be mixed in the resin, in order to enhance adhesion between the substrate 1 and the under clad layer 2.

The coupling agents that may be used include, for example, epoxy silane coupling agent, and amino silane coupling agent. The epoxy silane coupling agents that may be used include, for example, 2-(3,4-epoxycyclohexyl)ethyltrimethoxy silane, 3-glycidoxypropyltrimethoxy silane, 3-glycidoxypropylmethyldiethoxy silane, and 3-glycidoxypropyltriethoxy silane. The amino silane coupling agents that may be used include, for example, 3-aminopropyltrimethoxy silane, and 3-aminopropyltriethoxy silane.

Then, the core layer 3 is formed on the under clad layer 2, as shown in FIG. 1(c) to FIG. 1(f). The core layer 3 is formed using photopolymerizable resin composition.

The photopolymerizable resin composition comprises a fluorene derivative expressed by the following general formula (1) and/or the following general formula (2) and a photoacid generator.

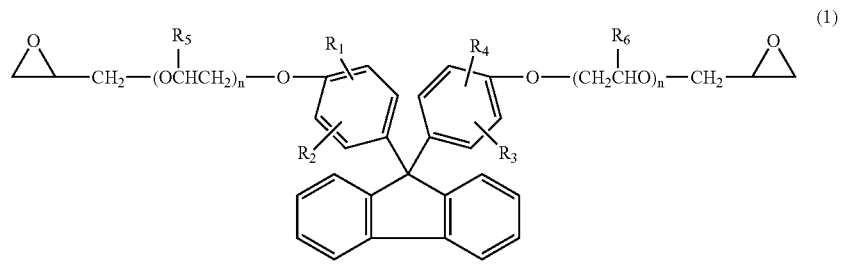

(1)

(In the formula, R1–R4 are the same or different from each other and each of them represents a hydrogen atom or an alkyl group with carbon number 1–6, R5 and R6 are the same or different from each other and each of them represents a hydrogen atom or a methyl group, and n represents an integer of 0–10 for each repeating unit).

In the general formula (1), the alkyl groups with carbon number 1–6 represented by R1–R4 include, for example, methyl, ethyl, n-propyl, isopropyl, n-butyl, isobutyl, s-butyl, t-butyl, n-pentyl, neopentyl, and n-hexyl.

Also, in the general formula (1), it is preferable that R1–R6 are all hydrogen atoms and n=0 or 1 for each repeating unit. To be more specific, the fluorene derivatives include, for example, bisphenoxyethanol fluorenediglycidyl ether (epoxy equivalent: 320) with hydrogen atoms for all of R1–R6 and n=1 for both repeating unit.

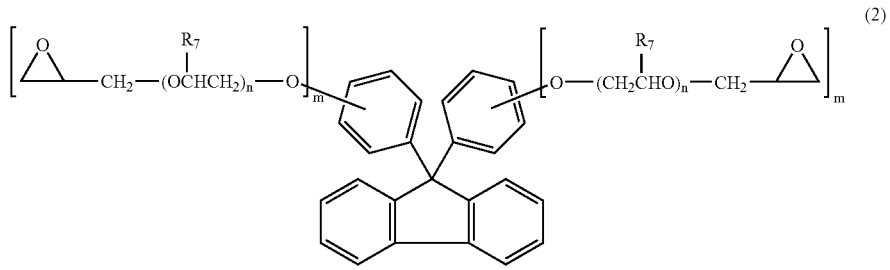

(In the formula, R7 represents a hydrogen atom or a methyl group for each, n represents an integer of 0–10 for each repeating unit, and m represents an integer of 2–5 for each repeating unit).

In the general formula (2), it is preferable that n=0 for each repeating unit, and m=2 for each repeating unit. To be more specific, the fluorene derivatives include, for example, bisphenol fluorenetetraglycidyl ether (epoxy equivalent: 200) expressed by the general formula (3) below.

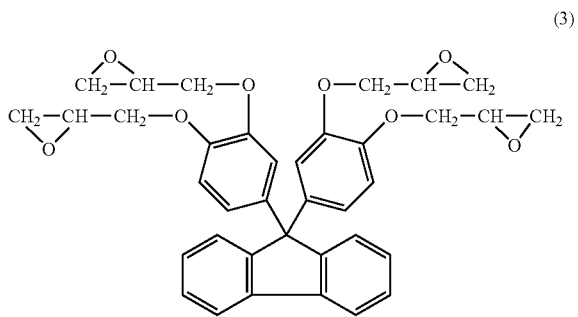

These fluorene derivatives (the fluorene derivative shown in the general formula (1) above and the fluorene derivative shown in the general formula (2) above) may be used singly or in combination of two or more. These fluorene derivatives can be produced by a known method.

The mixing ratio of the fluorene derivative is, for example, in the range of 50–99.9 weight %, or preferably 80–99 weight % per a total amount of photopolymerizable resin composition. When the mixing ratio of the fluorene derivative is less than 50 weight %, there is the possibility that it may become hard to form a film from the resin after coated. On the other hand, when the mixing ratio of the fluorene derivative is more than 99.9 weight %, the mixing ratio of the photoacid generator is decreased so that there is the possibility that the resin may be cured insufficiently.

No particular limitation is imposed on the photoacid generator. For example, a known photoacid generator, such as onium salt, may be used as the photoacid generator. The onium salts that may be used include, for example, diazonium salt, sulfonium salt, iodonium salt, phosphonium salt, and selenium salt. Also, these salts (counter ions) include, for example, anions, such as $CF_3SO_3^-$, $BF_4^-$, $PF_6^-$, $AsF_6^-$, and $SbF_6^-$, can be cited.

To be more specific, 4,4-bis[di(βhydroxyethoxy]phenyl-sulfinio]phenylsulfide-bis-hexafluoroantimonate, allylsulfonium hexafluorophosphate, triphenylsulfonium triflate, 4-chlorobenzene diazonium hexafluorophosphate, triphenylsulfonium hexafluoroantimonate, triphenyl sulfonium hexafluorophosphate, (4-phenylthiophenyl)diphenyl sulfonium hexafluorophosphate, bis[4-(diphenylsulfonio)phenyl]sulfide-bis-hexafluoroantimonate, bis[4-(diphenylsulfonio)phenyl]sulfide-bis-hexafluorophosphate, (4-methoxyphenyl)diphenyl sulfonium hexafluoroantimonate, (4-methoxyphenyl)phenyl iodonium hexafluoroantimonate, bis(4-t-butylphenyl)iodonium hexafluorophosphate, benzyl-triphenyl phosphonium hexafluoroantimonate, and triphenyl selenium hexafluorophosphate can be cited as the photoacid generator. The photoacid generators can be used singly or in combination of two or more.

The mixing ratio of the photoacid generator is, for example, in the range of 0.1–10 parts by weight, or preferably 0.5–5 parts by weight, per 100 parts by weight of fluorene derivative.

In addition to the components above, various kinds of components, such as reactive oligomer and diluent, may be mixed in the photopolymerizable resin composition within the range within which the excellent effect of the present invention is not inhibited.

The reactive oligomers that may be used include, for example, epoxy(metha)acrylate, urethane acrylate, butadiene acrylate, and oxetane. Oxetane is preferably used. The addition of only a small amount of oxetane can promote the curing of the photopolymerizable resin composition. To be more specific, oxetanes that may be used include, for example, 3-ethyl-3-hydroxymethyloxetane, 3-ethyl-3-(phenoxymethyl)oxetane, di(1-ethyl(3-oxetanyl))methyl ether, and 3-ethyl-3-(2-ethylhexylmethyl)oxetane. These reactive oligomers may be used singly or in combination of two or more. The mixing ratio of the reactive oligomer is, for example, in the range of 5–100 parts by weight per 100 parts by weight of fluorene derivative.

The diluents that may be used include, for example, alkyl monoglycidyl ether with carbon number of 2–25 (e.g. butyl glycidyl ether, 2-ethylhexyl glycidyl ether, etc.), butanediol diglycidyl ether, 1,6-hexanediol diglycidyl ether, neopentyl glycol diglycidyl ether, dodecanediol diglycidyl ether, pentaethyltriol polyglycidyl ether, trimethylolpropane polyglycidyl ether, glycerol polyglycidyl ether, phenyl glycidyl ether, resorcin glycidyl ether, p-tert-butylphenyl glycidyl ether, allyl glycidyl ether, tetrafluoropropyl glycidyl ether, octafluoropropyl glycidyl ether, dodecafluoropentyl glycidyl ether, styrene oxide, 1,7-octadienediepoxide, limonene diepoxide, limonene monoxide, α-pinene epoxide, β-pinene epoxide, cyclohexene epoxide, cyclooctene epoxide, and vinyl cyclohexene oxide. In view of heat resistance and transparency, epoxy having an alicyclic structure in molecular, such as 3,4-epoxy cyclohexenylmethyl-3',4'-epoxycyclohexene carboxylate, 3,4-epoxy cyclohexenylethyl-8,4-epoxycyclohexene carboxylate, vinylcyclohexene dioxide, allylcyclohexene dioxide, and 8,4-epoxy-4-methylcyclohexyl-2-propylene oxide, and bis (3,4-epoxycyclohexyl) ether, can be cited as the preferable diluent. These diluents may be used singly or in combination of two or more. The mixing ratio of the diluent is, for example, in the range of 5–200 parts by weight per 100 parts by weight of fluorene derivative.

Then, the photopolymerizable resin composition can be prepared as the varnish by blending the components above and mixing and dissolving those components in the solvent.

The solvents that may be used include, for example, 2-butanone, cyclohexanone, N,N-dimethylacetamide, diglyme, diethylene glycol methylethyl ether, propylene glycol methyl acetate, propylene glycol monomethyl ether, tetramethylfuran, and dimethoxy ethane. These solvents are used singly or in combination of two or more, and a proper quantity of solvent is used to produce desirable viscosity for the coating The photopolymerizable resin composition can be prepared as the varnish without using any solvent, for example, by using the diluent as a substitute for solvent and dissolving and mixing the other components in that diluent.

Then, the varnish thus obtained is coated over the under clad layer 2 to form a core layer 3, first, and, then, the core layer 3 is dried to form a resin layer 4, as shown in FIG. 1(c).

The coating of the varnish is performed using, for example, a spin-coating method, a dipping method, a casting method, an injection method, and an ink-jet method, as is the case with the above. The varnish is dried by heating at e.g. 50–120° C. As a result of this, the resin layer 4 is formed in the form of a film on which no substantial adhesion (surface tack) remains.

Then, the resin layer 4 is exposed to light through a photo mask 5 formed into a predetermined pattern, as shown in FIG. 1(d). Though the exposure methods that may be used include, for example, a projection exposure method, a proximity exposure method, and a contact exposure method, since the resin layer 4 does not have the surface tack, the contact exposure method that can allow the photo mask 5 to contact with the resin layer 4 is preferably used.

Since the contact exposure method can allow the photo mask 5 to directly contact with the surface of the resin layer 4, the need to use the spacer can be eliminated, thus providing the advantage of providing improved workability, while a pattern of a latent image is formed on the resin layer 4 reliably.

The irradiated radiations that may be used for the exposure include, for example, visible radiation, ultraviolet radiation, infrared radiation, X-ray, α-ray, β-ray, and γ-ray. Ultraviolet radiation is preferably used. Using the ultraviolet radiation can produce the advantageous result that a large energy is irradiated and a curing rate is increased. Also, the irradiation system can be reduced in size and cost and thus the production cost can be reduced. To be more specific, the resin layer 4 is irradiated with ultraviolet by using a light source, such as a low pressure mercury lamp, a high pressure mercury lamp, an extra-high pressure mercury lamp. The irradiation of the ultraviolet is for example in the range of 10–10,000 mJ/cm$^2$, or preferably 50–3,000 mJ/cm$^2$.

Further, when the core layer 3 having a higher hardness is produced, the resin layer 4 after exposed is subjected to heating (post exposure bake) at 80–250° C., or preferably 100–200° C., for 10 seconds to 2 hours, or preferably 5 minutes to 1 hour. This can produce the result that when the resin is cured, as mentioned later, the cross-linking reaction is promoted, so that a high, three-dimension, cross-linking is formed in the resin. This can produce the core layer 3 having an increased hardness, thus producing increased heat resistance of the optical waveguide.

This exposure (exposure and post exposure bake) produces the result that an unexposed portion of the resin layer 4 is dissolved in the development process mentioned next, so that a negative image of a latent image is formed on the resin layer 4.

Sequentially, the resin layer 4 thus exposed (or post exposure baked) is developed to form it into a pattern, as shown in FIG. 1(e).

The development is performed, for example, by dipping, spraying, or paddling. For example, organic solvent, or organic solvent containing alkaline liquid solution is used as a developing agent. The developing agents and developing conditions are properly selected, depending on the composition of the photopolymerizable resin composition used.

The unexposed portion of the resin layer 4 is dissolved by this development, whereby the resin layer 4 is patterned.

Thereafter, the resin layer 4 thus patterned is cured to form the core layer 3, as shown in FIG. 1(f). The core layer 3 is cured by heating at e.g. 80–250° C., whereby the core layer 3 is formed in the form of a predetermined pattern.

The core layer 3 has a thickness of e.g. 20–100 µm for a multi-mode optical waveguide, while it has a thickness of e.g. 2–10 µm for a single-mode optical waveguide.

In the present invention, since the photopolymerizable resin composition containing the fluorene derivative is used, the adhesion of the varnish can be increased. Therefore, the varnish can be coated thickly, so the resin layer 4 can be formed to have an increased thickness. As a result of this, a thick core layer 3 usable for the multi-mode optical waveguide can be formed easily.

Although the core layer 3 is patterned by the method wherein the resin layer 4, after formed, is exposed to light through the photo mask 5 and then is developed so that the resin layer 4 is formed into a pattern in the illustrated method, the resin layer 4 can be patterned without being exposed to light and developed. For example, the resin layer 4 after formed may be patterned by a laser process and the like. In this alternative also, since the resin layer 4 is in the form of a film on which no substantial adhesion (surface tack) remains, the resin layer 4 can be patterned with accuracy by the laser process, ensuring the reliable patterning of the resin layer 4.

Then, an over clad layer 6 is formed on the under clad layer 2 in such a manner as to cover the core layer 3, to produce the optical waveguide, as shown in FIG. 1(g).

It is preferable that the over clad layer 6 is formed from the same resin as the resin used to form the under clad layer 2 in the same manner as the above, in order to make a refractive index of the over clad layer 6 conform to that of the under clad layer 2.

The over clad layer 6 has a thickness of e.g. 5–100 µm for the multi-mode optical waveguide, while it has a thickness of e.g. 1–20 µm for the single-mode optical waveguide.

Although the optical waveguide is formed on the substrate 1 in the illustrated method, when a flexible optical waveguide in a film form is formed, the substrate 1 is removed, for example, by etching or by stripping, as shown in FIG. 1(h).

In the optical waveguide produced in the method above, the core layer 3 is required to be higher in refractive index than the under clad layer 2 and the over clad layer 6. The refractive indexes of the respective layers can be adjusted by properly selecting the compositions of the materials used to form the respective layers.

The optical waveguide thus produced can be properly cut to an adequate length for use, depending on the intended purposes and applications. Usually, the length of the optical waveguide is in the range of 1 mm to 30 cm.

In the production method of the optical waveguide described above, since the resin layer 4 is formed of photopolymerizable resin composition comprising fluorene derivative and photoacid generator, the resin layer 4 having no substantial surface tack can be formed. This can ensure the reliable forming of the pattern when the core layer 3 is formed. Particularly when the resin layer 4 is patterned by the exposure to light and the development, the resin layer 4 can be put in contact with the photo mask 5 for the exposure to light by the contact exposure method without any need to define a predetermined space between the photo mask 5 and the resin layer 4.

Thus, according to this method, the number of processes and time-consuming and complicated works involved in the interposition of the spacer can be reduced, thus providing increased production efficiency. In addition, even when the photo mask 5 is put in contact with the resin layer 4, the contamination of the photo mask 5 due to the contact with the resin layer 4 can be reduced. Further, since the resin layer 4 is hard to flow, the optical waveguide can be formed in a stable form.

As a result of this, the optical waveguide can be produced at reduced costs by virtue of the improved production efficiency and also can be applicable in various fields as the optical waveguide of high quality having excellent shape stability.

No particular limitation is imposed on the formation of the optical waveguide thus produced. To be more specifically, the formations of the optical waveguides that may be used include, for example, a linear optical waveguide, a bent optical waveguide, a crossing optical waveguide, a Y-branch optical waveguide, a slab optical waveguide, a Mach-Zehnder-type optical waveguide, an AWG-type optical waveguide, a grating, and an optical waveguide lens.

Optical devices in which the optical waveguides are built in include, for example, a wavelength filter, an optical switch, an optical branching device, a photosynthezing device, an optical systhesizing/branching device, an optical amplifier, a wavelength converter, a wavelength division device, an optical spliter, a directional coupler, and an optical communication module wherein a laser diode and a photodiode are hybrid-integrated and a photoelectricity mixed-loading substrate.

EXAMPLES

While in the following, the present invention will be described in further detail with reference to Examples, the present invention is not limited to any of them.

Preparation of Varnish

Varnishes A–H were prepared by mixing and dissolving the respective components in solvent of cyclohexane by a prescription shown in TABLE 1. The refractive indexes of the cured materials produced by curing the respective varnishes measured at a wavelength of 633 nm are also shown in TABLE 1.

Fluorene derivative-1: Bisphenoxyethanol fluorenediglycidyl ether
(In the general formula (1), R1–R6 are all hydrogen atoms, and n=1)

Fluorene derivative-2: Bisphenol fluorenediglycidyl ether
(In the general formula (1), R1–R6 are all hydrogen atoms, and n=0)

Fluorene derivative-3: Bisphenol fluorenetetraglycidyl ether expressed by the general formula (3)
(In the general formula (2), n=0, and m=2, Name of article: CAG available from Osaka Gas Chemical Co., Ltd.)

Diluent: 3,4-epoxy cyclohexenylmethyl-3',4'-epoxycyclohexene carboxylate
(Celloxide 2021P available from Daicel Chemical Industries, Ltd.)

Photoacid generator: 50% propioncarbide solution of 4,4-bis[di(βhydroxyethoxy]phenylsulfinio]phenylsulfide-bis-hexafluoroantimonate Example 1

A substrate wherein an aluminum layer having a thickness of 20 nm was formed on a 10 cm×10 cm glass substrate by a vacuum deposition method was prepared(Cf. FIG. 1(a)).

The varnish A was coated over the substrate by the spin coat method and then dried at 90° C. for 15 minutes, to form a resin layer. Thereafter, the whole area of the resin layer was irradiated with ultraviolet irradiation of 2,000 mJ/cm$^2$ and then heated at 170° C. for 30 minutes, to form an under clad layer having a thickness of 30 μm (Cf. FIG. 1(b)).

Sequentially, the varnish B was coated over the under clad layer by the spin coat method and then dried at 90° C. for 15 minutes, to form a resin layer (Cf. FIG. 1(c)). Then, the resin layer was irradiated with ultraviolet irradiation of 2,000 mJ/cm$^2$ via a photo mask (an artificial quartz-based chromium mask) on which a linear optical waveguide pattern of 50 μm wide was depicted (Cf. FIG. 1(d)). At this time, the photo mask was put into direct contact with the resin layer, but no adhesion of the resin to the photo mask was found after the exposure of the resin layer to light.

Thereafter, the resin layer was heated at 90° C. for 60 minutes after the exposure and then was developed by dipping it in acetonitrile developing solution to form the resin layer into a pattern (Cf. FIG. 1(e)). Thereafter, the resin layer was heated at 170° C. for 30 minutes to thereby produce the core layer having a square-shaped section of 50 μm thick and 50 μm wide (Cf. FIG. 1(f)).

TABLE 1

| Varnish | A | B | C | D | E | F | G | H |
|---|---|---|---|---|---|---|---|---|
| | | | | | | | (parts by weight) | |
| Fluorene derivative-1 | 83 | 67 | 74 | 50 | 92 | 100 | | |
| Fluorene derivative-2 | | 23 | | 50 | | | | |
| Fluorene derivative-3 | | | | | | | 70 | 100 |
| Diluent | 17 | | 26 | | 8 | | 30 | |
| Photoacid generator | 1 | 1 | 1 | 1 | 1 | 1 | 1 | 1 |
| Refractive index (Measured at wavelength of 633 nm) | 1.585 | 1.617 | 1.577 | 1.626 | 1.595 | 1.603 | 1.580 | 1.610 |

Then, the varnish A was coated over the under clad layer including the core layer by the spin coat method and then dried at 90° C. for 15 minutes, to form a resin layer. Thereafter, the whole area of the resin layer was irradiated with ultraviolet irradiation of 2,000 mJ/cm$^2$ and then heated at 170° C. for 30 minutes, to form an over clad layer having a thickness of 80 μg m (Cf. FIG. 1(g)). A multi-mode optical waveguide having a specific refractive index Δ of 2.0% was produced in the manner described above.

Further, the resulting laminate was dipped in hydrochloride solution of ferric chloride of 40° C., to remove the substrate by etching, so that the flexible optical waveguide in a film form was formed (Cf. FIG. 1(h)).

Finally, the flexible optical waveguide thus produced was cut to a length of 5 cm with a dicing device (Model 522 available from Disco Corporation). After the edge of the flexible optical waveguide was trimmed, an optical energy communication loss (an optical propagation loss) of the optical waveguide was measured by a common cutback method using a laser beam having a wavelength of 850 nm. The optical energy communication loss was 0.05 dB/cm.

Also, even when the optical waveguide was bent at a radius of curvature R of 20 mm, no optical energy communication loss was observed and the good flexibility of the same was confirmed. Further, even when the optical waveguide was bent at a radius of curvature R of the order of 5 mm for mounting on a device, the optical waveguide was not damaged.

Example 2

Except that the varnish C was used as substitute for the varnish A, the same operation as in Example 1 was performed to form an under clad layer having a thickness of 30 μm on the substrate.

Sequentially, except that the varnish D was used as substitute for the varnish B, the same operation as in Example 1 was performed to form a core layer having a square-shaped section of 50 μm thick and 50 μm wide on the under clad layer.

At this time of exposure, the photo mask was put into direct contact with the resin layer, but no adhesion of the resin to the photo mask was found after the exposure of the resin layer to light.

Thereafter, except that the varnish C was used as substitute for the varnish A, the same operation as in Example 1 was performed to form an over clad layer having a thickness of 80 μm. A multi-mode optical waveguide having a specific refractive index Δ of 3.0% was produced in the manner described above.

The substrate was not removed. The flexible optical waveguide thus produced was cut to a length of 5 cm with the dicing device (Model 522 available from Disco Corporation) in the same manner as in Example 1. After the edge of the flexible optical waveguide was trimmed, an optical energy communication loss of the optical waveguide was measured by the common cutback method using the laser beam having a wavelength of 850 nm. The optical energy communication loss was 0.05 dB/cm.

Example 3

A 4-inch silicon wafer was prepared as the substrate, first. Then, the varnish E was coated over that substrate by the spin coat method and then was dried at 90° C. for 15 minutes, to form the resin layer. Thereafter, the whole area of the resin layer was irradiated with ultraviolet irradiation of 2,000 mJ/cm$^2$ and then heated at 170° C. for 30 minutes, to form an under clad layer having a thickness of 10 μm.

Sequentially, except that the varnish F was used as substitute for the varnish B and the width of the pattern of the photo mask was changed to 6 μm, the same operation as in Example 1 was performed to form a core layer having a square-shaped section of 6 μm thick and 6 μm wide on the under clad layer.

At this time of exposure, the photo mask was put into direct contact with the resin layer, but no adhesion of the resin to the photo mask was found after the exposure of the resin layer to light.

Thereafter, except that the varnish E was used as substitute for the varnish A, the same operation as in Example 1 was performed to form an over clad layer having a thickness of 15 μm. A multi-mode optical waveguide having a specific refractive index Δ of 0.5% was produced in the manner described above.

The substrate was not removed. The flexible optical waveguide thus produced was cut to a length of 5 cm with the dicing device (Model 522 available from Disco Corporation) in the same manner as in Example 1. After the edge of the flexible optical waveguide was trimmed, an optical energy communication loss of the optical waveguide was measured by the common cutback method using the laser beam having a wavelength of 1,550 nm. The optical energy communication loss was 1.0 dB/cm.

Example 4

A 10 cm×10 cm glass epoxy substrate (FR4) was prepared, first. Then, the varnish G was coated over that substrate by the spin coat method and then was dried at 90° C. for 15 minutes, to form the resin layer. Thereafter, the whole area of the resin layer was irradiated with ultraviolet irradiation of 2,000 mJ/cm$^2$ and then heated at 170° C. for 30 minutes, to form an under clad layer having a thickness of 30 μm.

Sequentially, except that the varnish H was used as substitute for the varnish B, the same operation as in Example 1 was performed to form a core layer having a square-shaped section of 50 μm thick and 50 μm wide on the under clad layer.

At the time of exposure, the photo mask was put into direct contact with the resin layer, but no adhesion of the resin to the photo mask was found after the exposure of the resin layer to light.

Thereafter, except that the varnish G was used as substitute for the varnish A, the same operation as in Example 1 was performed to form an over clad layer having a thickness of 80 μm. A multi-mode optical waveguide having a specific refractive index Δ of 1.9% was produced in the manner described above.

Further, the optical waveguide thus produced was heat-treated at 260° C. for 3 minutes. The substrate was not removed. The flexible optical waveguide thus produced was cut to a length of 5 cm with the dicing device (Model 522 available from Disco Corporation) in the same manner as in Example 1. After the edge of the flexible optical waveguide was trimmed, an optical energy communication loss of the optical waveguide was measured by the common cutback method using the laser beam having a wavelength of 850 nm. The optical energy communication loss was 0.08 dB/cm.

While the illustrative embodiment and example of the present invention are provided in the above description, such is for illustrative purpose only and it is not to be construed restrictively. Modification and variation of the present invention that will be obvious to those skilled in the art is to be covered by the following claims.

What is claimed is:

1. A production method of an optical waveguide comprising the step of forming a core layer from photopolymerizable resin composition comprising fluorene derivative expressed by the following general formula (1) and a photoacid generator:

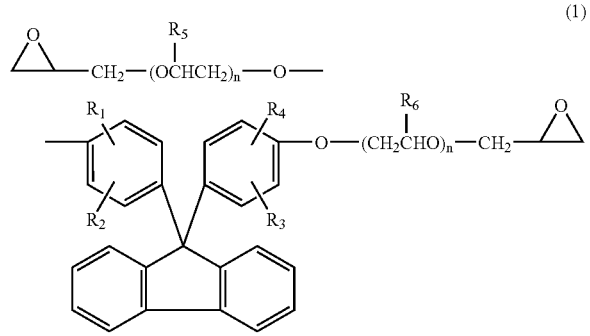

wherein $R_1$ to $R_4$ are the same or different and each represents a hydrogen atom or an alkyl group having 1 to 6 carbon atoms and wherein $R_5$ and $R_6$ are the same or different and each represents a hydrogen atom or a methyl group, and n represents an integer of 0–10 for each repeating unit.

2. The production method of the optical waveguide according to claim 1, wherein in the general formula (1), $R_1$ to $R_6$ are all hydrogen atoms, and n is 0 or 1 for each repeating unit.

3. The production method of the optical waveguide according to claim 1, further comprising the step of forming an under clad layer, wherein the step of forming the core layer comprises:

the step of forming a resin layer on the under clad layer by coating the photopolymerizable resin composition comprising the fluorene derivative expressed by the general formula (1) and the photoacid generator over the under clad layer and then heating it; and the step of forming the resin layer into a pattern.

4. The production method of the optical waveguide according to claim 3, wherein the step of forming the resin layer into a pattern comprises the step of exposing the resin layer to light in a state of being contacted with a photo mask by a contact exposure method and then developing the resin layer.

5. A production method of an optical waveguide comprising the step of forming a core layer from photopolymerizable resin composition comprising fluorene derivative expressed by the following general formula (2) and a photoacid generator:

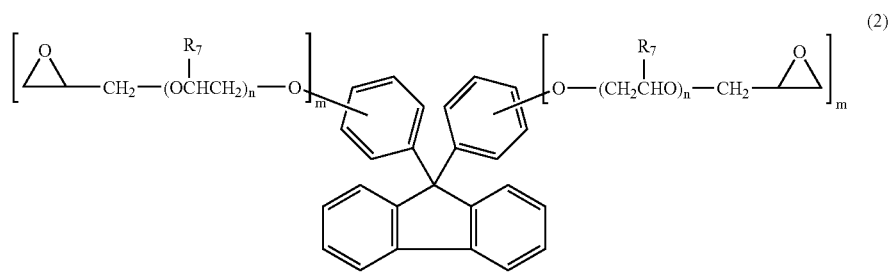

wherein each $R_7$ independently represents a hydrogen atom or a methyl group, n represents an integer of 0–10 for each repeating unit, and m represents an integer of 2–5 for each repeating unit.

6. The production method of the optical waveguide according to claim 5, wherein in the general formula (2), n is 0 for both repeating units and m is 2 for both repeating units.

7. The production method of the optical waveguide according to claim 5 further comprising the step of forming an under clad layer, wherein the step of forming the core layer comprises:

the step of forming a resin layer on the under clad layer by coating the photopolymerizable resin composition comprising the fluorene derivative expressed by the general formula (2) and the photoacid generator over the under clad layer and then heating it; and the step of forming the resin layer into a pattern.

8. The production method of the optical waveguide according to claim 7, wherein the step of forming the resin layer into a pattern comprises the step of exposing the resin layer to light in a state of being contacted with a photo mask by a contact exposure method and then developing the resin layer.

9. An optical waveguide comprising a core layer formed from photopolymerizable resin composition comprising fluorene derivative expressed by the following general formula (1) and a photoacid generator:

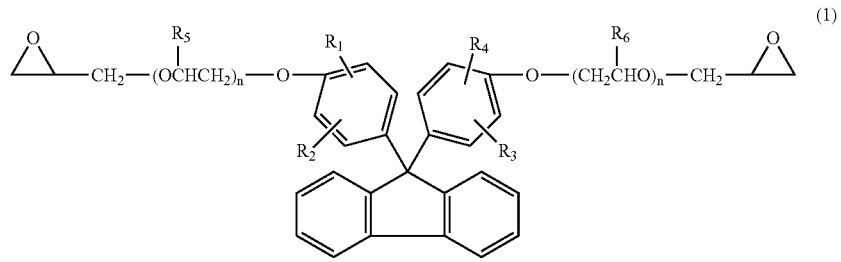
(1)

wherein $R_1$ to $R_4$ are the same or different and each represents a hydrogen atom or an alkyl group having 1 to 6 carbon atoms and wherein $R_5$ and $R_6$ are the same or different and each represents a hydrogen atom or a methyl group, and n represents an integer of 0–10 for each repeating unit.

10. The optical waveguide according to claim 9, wherein in the general formula (1), $R_1$ to $R_6$ are all hydrogen atoms, and n is 0 or 1 for each repeating unit.

11. An optical waveguide comprising a core layer formed from photopolymerizable resin composition comprising fluorene derivative expressed by the following general formula (2) and a photoacid generator:

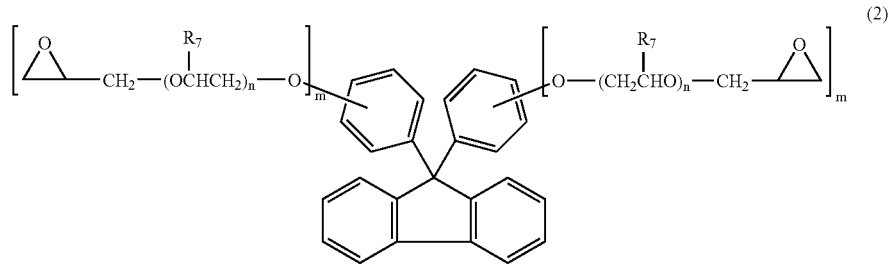
(2)

wherein each $R_7$ independently represents a hydrogen atom or a methyl group, n represents an integer of 0–10 for each repeating unit, and m represents an integer of 2–5 for each repeating unit.

12. The optical waveguide according to claim 11, wherein in the general formula (2), n is 0 for both repeating units and m is 2 for both repeating units.

13. The production method of the optical waveguide according to claim 3, further comprising mixing a coupling agent in the resin composition.

14. The production method of the optical waveguide according to claim 3, wherein said heating comprises heating to a temperature of about 300–400° C.

15. The production method of the optical waveguide according to claim 3, wherein the photopolymerizable resin composition comprises about 50–99.9 weight percent of fluorene derivative.

16. The production method of the optical waveguide according to claim 3, wherein the photopolymerizable resin composition comprises about 80–99.9 weight percent of flourene derivative.

17. The production method of the optical waveguide according to claim 7, further comprising mixing a coupling agent in the resin composition.

18. The production method of the optical waveguide according to claim 7, wherein said heating comprises heating to a temperature of about 300–400° C.

19. The production method of the optical waveguide according to claim 7, wherein the photopolymerizable resin composition comprises about 50–99.9 weight percent of flourene derivative.

20. The production method of the optical waveguide according to claim 7, wherein the photopolymerizable resin composition comprises about 80–99.9 weight percent of flourene derivative.

* * * * *